2,871,728

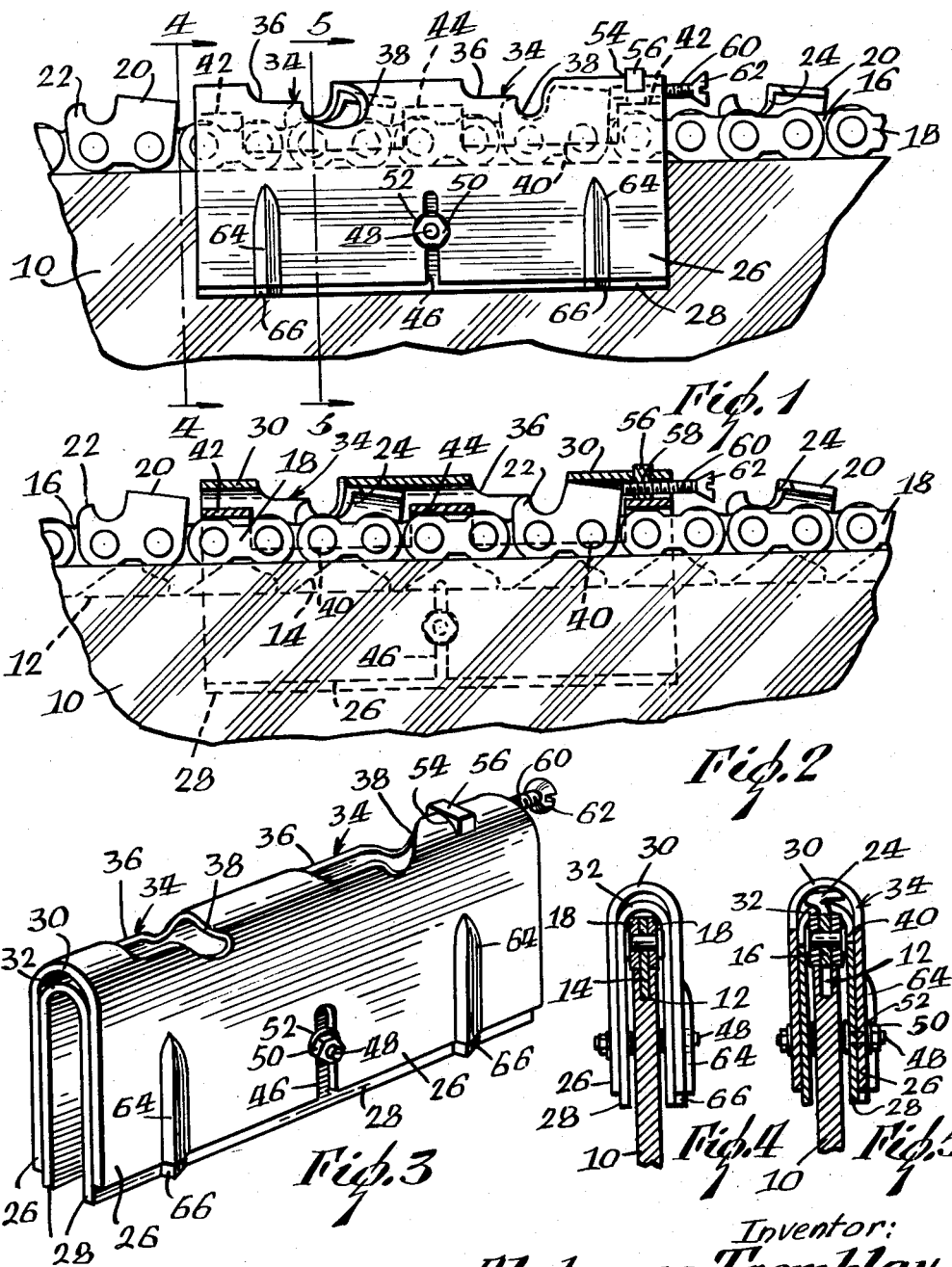

SAW FILING GUIDE

Alphonse Tremblay, La Decharge, Quebec, Canada

Application December 16, 1957, Serial No. 702,911

7 Claims. (Cl. 76—31)

This invention relates to a guide for use in filing the teeth of chain saws.

One important object of this invention is to provide a novel guide for the purpose set forth having simple parts requiring a minimum of adjustments.

Another important object of the invention is to provide a guide of this class so constructed that two adjacent cutter teeth may be filed without shifting the guide along the saw.

A third important object of the invention is to provide a novel saw guide having means not only for guiding the filing of cutter teeth in a saw but also, without change of adjustment, will guide the file in bringing the raker teeth to uniform height.

A fourth important object of the invention is to provide a novel and simple guide for the purpose which may adjust to a chain saw and used by an untrained person with assurance that when the filing is finished the saw will be in proper shape.

With the above and other objects in view, as will be presently apparent, the invention consists in general of certain novel details of construction and combinations of parts hereinafter fully described, illstrated in the accompanying drawings and particularly claimed.

In the drawings like characters of reference indicate like parts in the several views, and:

Figure 1 is a side elevation of a portion of a chain saw and also showing the invention in elevation as applied thereto;

Figure 2 is a view similar to Figure 1 but showing a vertical longitudinal section on the median line of the invention;

Figure 3 is a perspective view of the invention removed from the saw;

Figure 4 is a section on the line 4—4 of Figure 1; and

Figure 5 is a section on the line 5—5 of Figure 1.

As here illustrated the numeral 10 indicates a portion of the blade of a chain saw drive which has a guide groove 12 extending along its edge. The chain saw itself is built up of a series of links each having an extension or tail 14 slidably engaged in the groove 12. These links are arranged to provide single links 16 pivotally connected at their ends to spaced pairs of double links 18 which ride on the blade 10 at each side of the groove 12. Every other pair of the double links 18 carries a cutter tooth 20 and a raker tooth 22. The teeth 20 have diagonally disposed cutting edges which incline in alternate tooth to one side and the other of the saw.

The guide is formed of a pair of body members 26 and 28 which are of inverted U-shape in cross section and are rested with the member 28 inside the member 26. These members have semi-circular bends 30 and 32. Spaced longitudinally of the bend 30 at a distance equal to the distance between two cutter teeth 20 is a pair of notches 34. Each of these notches has a relatively shallow portion 36 merging into a deeper portion 38. The portions 36 extend at right angles across the member 26 while the portions 38 extend diagonally across member 26, being alternately inclined in one direction and the other to conform to the alternate inclinations of the cutting edges 24.

The bend 32 of the inner member is cut away at 40 to provide a pair of end straps 42 and a center strap 44 which connect the parallel sides of the member and rest on the links 18 intermediate those carrying the saw teeth.

In order to adjust the member 26 to such height that a file worked across the shallow notch 36 will act to properly file the raker teeth the sides or legs of the member are provided with opposed slots 46 running up from the centers of their lower edges. Through the legs of the member 28 extends a bolt 48 which extends through the slots 46 and has a washer 52 and a clamping nut 50 on each end. By this means the nut 50 on one end of the bolt may be loosened, the member 26 raised to the desired height to suit the raker teeth and the nut tightened.

To adjust the guide longitudinally to proper position relative to the cutter teeth 20 the bend 30 is slotted near one end as at 54 and in this slot is fitted a key 56 carrying a nut 58 in which is fitted an adjusting screw 60 having a kerf provided head 62. When the invention is placed on the saw the two members 26 and 30 are moved along the saw until the deeper notches 38 are brought into proper alinement with the cutting edges 24 so that the screw 60 may be turned to engage the back of a cutter tooth as shown in Figure 2.

For the purpose of avoiding any rattling or chattering of the members 26 and 28 relative to each the legs of these members are provided with interfitting ribs 64 and 66.

Although a specific embodiment of the invention has been illustrated and described, it will be understood that various alterations in the details of construction may be made without departing from the scope of the invention as indicated by the appended claims.

What I claim is:

1. In a filing guide for chain saws, a pair of body members each being bent on a longitudinal line to provide a U-shaped bend and a pair of depending parallel legs, said members providing inner and outer members with the legs of one vertically slidable and fitting against the legs of the other, supporting means for engaging a chain saw formed on the inner member, file guides formed in the outer member, securing means for holding the members in vertically adjusted relation, and positioning means for holding said members in adjusted position along a chain saw.

2. The device of claim 1 wherein the supporting means consists of sections of the bend of the inner member are spaced to rest on top of spaced links of a chain saw.

3. The device of claim 1 wherein the bend of the outer member is provided with spaced notches to form the file guides, said notches each having a shallow portion merging into a deeper portion.

4. The device of claim 3 wherein the shallow portions of the notches extend at right angles to the bend and the deeper portions extend diagonally across the bend at opposite angles.

5. The device of claim 4 wherein the notches are spaced at a distance equivalent to the distance between two adjacent cutter teeth of a chain saw.

6. The device of claim 1 wherein the securing means consists of opposed slots extending upwardly from the bottom edge of the outer member legs, a bolt extending through the inner member and said slots, and clamping nuts carried by the ends of said bolt.

7. The device of claim 1 wherein the positioning means consists of a nut carried by one of said body members and a screw extending through said and adapted to have its point engage the rear face of a tooth of a chain saw.

No references cited.